United States Patent [19]

Ishida et al.

[11] Patent Number: 4,560,342
[45] Date of Patent: Dec. 24, 1985

[54] INJECTION MOLDING INSTRUMENT FOR FORMING RESIN CONCAVE LENSES

[76] Inventors: Takeshi Ishida; Yoshihiro Ishida, both of 289, Bessho-cho, Matsubara-shi, Osaka-Pref, Japan

[21] Appl. No.: 583,610

[22] Filed: Feb. 27, 1984

[51] Int. Cl.[4] .................. B29C 45/28; B29D 11/00
[52] U.S. Cl. ........................... 425/562; 264/1.1; 264/328.12; 425/566; 425/572; 425/588; 425/808
[58] Field of Search .......... 425/542, 557, 562, 565, 425/566, 567, 568, 569, 570, 571, 572, 575, 588, 808, 563, 564; 264/328.1, 328.8, 328.12, 1.1

[56] References Cited

U.S. PATENT DOCUMENTS

| | | | |
|---|---|---|---|
| 3,136,000 | 6/1964 | Slyk | 425/808 |
| 4,106,887 | 8/1978 | Yasuike et al. | 425/566 |
| 4,257,988 | 3/1981 | Matos et al. | 425/808 |
| 4,289,468 | 9/1981 | von Holdt | 425/566 |
| 4,364,878 | 12/1982 | Laliberte et al. | 425/808 |
| 4,434,120 | 2/1984 | Aloisio, Jr. et al. | 264/328.8 |

*Primary Examiner*—Jay H. Woo
*Assistant Examiner*—James C. Housel
*Attorney, Agent, or Firm*—Moonray Kojima

[57] ABSTRACT

Apparatus for forming a concave lens of resin material and adapted to be used, for example, in spectacles, video projection devices, etc., whereby raw material is fed into substantially the center thinner portion of the mold first and then radially outwardly until the material reaches the periphery, thereby to eliminate weld lines in the produced lenses.

1 Claim, 5 Drawing Figures

INJECTION MOLDING INSTRUMENT FOR FORMING RESIN CONCAVE LENSES

BACKGROUND OF THE INVENTION

Most conventional concave lenses usually have thin intermediate parts thereof. Thus, a quantity of molten resin material can barely be fed into the intermediate portion of the mold until a full quantity of resin can flow into the mold. The results are that a concave lens formed within the mold has a weld line in the radial directions partly due to the orientation of the flow and partly due to the difference in curing rate of the molten resin that has been fed. Because of the above mentioned facts, lenses formed by means of the instruments generally in wide use cannot be practically employed in the form of concave lenses, or more precisely, concave lenses cannot be produced through process of injection molding.

SUMMARY OF THE INVENTION

The present invention comprises a metal mold wherein a quantity of molten resin material to be fed is firstly fed into an intermediate thin portion of the mold, which portion being retarded in permitting hot water to circulate. Thereafter a feeding mouth is moved to thick portions of the mold, and continuously fed with the molten resin, thus making it possible to produce lenses that are quite free of weld lines.

Accordingly, the present invention has been made to eliminate all of the above mentioned drawbacks and disadvantages, and has as an object provision of an injection molding instrument for forming resin concave lenses. A quantity of molten resin material is fed into a metal mold from its intermediate thin portions to the thick portions surrounding said thin portions without discontinuity. Thus, the fed quantity flows from a center of the metal mold to the outwardly radial directions to permit the quantity in the mold to orient itself uniformly. Also, this results in injection of the molten metal in circumferential directions with uniformity. Thus, when a number of concave lenses are formed through the invention, weld lines are not formed on the produced lenses. Thus, it is possible to produce concave lenses which are substantially weld line free at low cost.

Another object is to provide an injection molding treatment for forming resin concave lenses wherein a feeding slider disposed within a runner in movable relation comprises a cylindrical member which is vertically dividable into longitudinal direction thereof so as to make it easy to take out the lenses produced.

A further object is to provide an injection molding instrument for forming resin concave lenses wherein a plurality of lens forming members are provided internally with feeding sliders thereby to make it possible to produce a number of resin concave lenses through a single operation.

A still further object is to provide an injection molding instrument for forming resin concave lenses wherein a plurality of feeding sliders are intercommunicated with a single driving means thereby to provide a dimensionally small and structurally simplified construction of the instrument which is effective enough to move the sliders all at once.

DETAILED DESCRIPTION OF PREFERRED EMBODIMENTS

Figure 2:
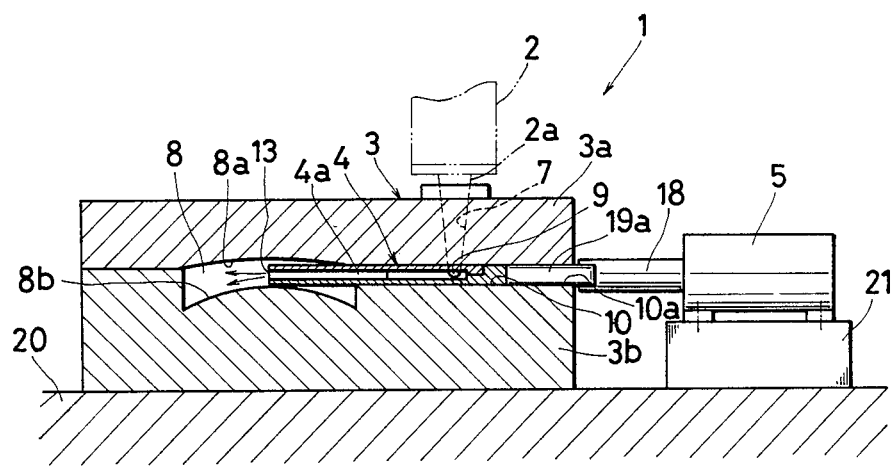
FIG. 2 is a vertical cross sectional elevational view of a metal mold portion of the extruding instrument carried out in accordance with the invention.

Setting forth now in detail a preferred embodiment of the invention in conjunction with the drawings wherein numeral 1 generally designates a main injection molding body for forming resin concave lenses, the body 1 comprises a resin feeding mouth 2, a metal mold 3, feeding sliders 4 and a moving or driving means 5 for driving the feeding sliders 4, horizontally left and right, as seen in FIG. 2.

In the resin feeding mouth 2 there is a molten raw resin material 6 such as for example acrylic resin, polycarbonate resin and/or styrol resin. Then, the resin material 6 is fed through a feeding nozzle 2a into an upper metal mold member 3a which will be described hereinafter.

The metal mold 3 comprises a substantially plane upper metal mold member 3a and a lower metal mold member 3b disposed in vertically opposite relation therewith. In this connection, the upper metal mold member 3a is provided vertically with a spool 7 which is adapted to feed the raw resin material 6. Further, the upper metal mold member 3a has its lower bilateral portions provided with upper surface member 8a forming a molding member 8 disposed bilaterally in opposite relation with one another. On the side of the spool 7 of the molding member 8 there are engraved first runners 9 parallel with second runners 10 in intercommunicating relation with one another. The second runners 10 are disposed in parallel with both sides of the metal mold 3 being internally communicated with molding member 8 and opened externally of the metal mold 3 with the feeding sliders 4 inserted slidably in the inside of the runners 10.

Figure 3:
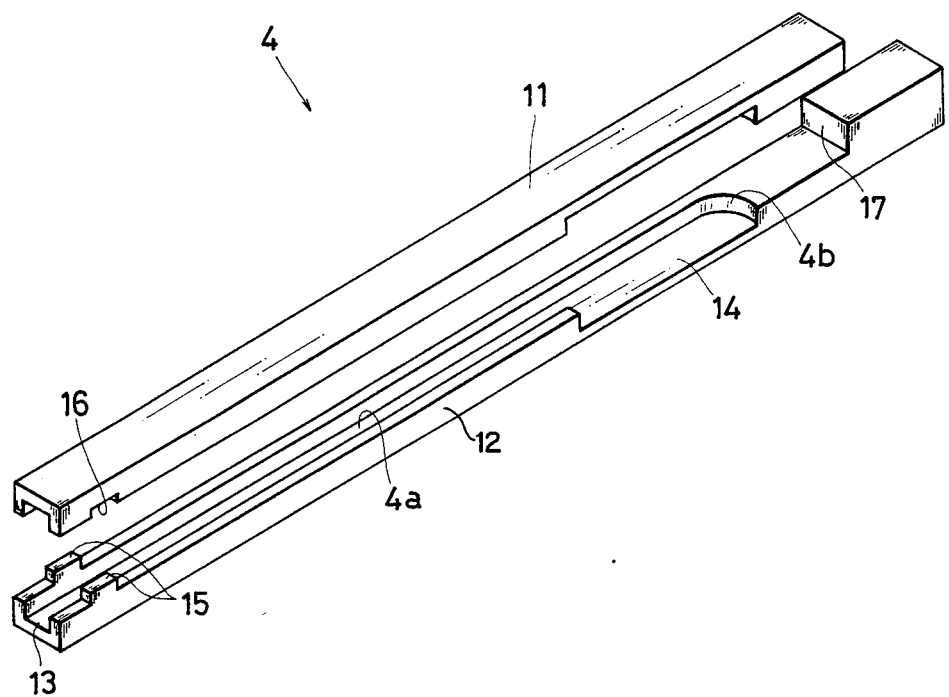
FIG. 3 is a perspective view of a feeding slider employed in the invention.

As is shown in FIG. 3, the feeding sliders 4 comprise an upper frame member 11 and lower frame member 12, which interconnect with each other and can be divided from each other. In the inside of the feeding slider 4, there is provided a mouth 13 for feeding the raw resin material 6 into mold 8.

Lengthwise of each side of the feeding sliders 4 opposite to each extremity 9a of the first runners 9, there is bored an aperture 14 having a length corresponding to radius of a concave lens (not shown in the drawing) which is substantially the moving amount of the raw resin material fed during injection. Further a channel 4a is provided in the feeding slider 4 to interconnect mouth 13 to aperture 14.

In an extremity of the lower frame member 12 there is provided an engageable projection 15 while in the lower surface portion of the upper frame member 11 opposite to the projection 15 there is formed a concave portion 16, further with the lower frame member 12 having a notch 17 formed so as to engage the upper frame member 11.

Preferably the driving or moving means 5 is composed of a hydro-cylinder or other suitable means, being adapted to forwardly and backwardly slide the feeding sliders 4 which are inserted into the second runners 10, and comprising a piston 18 and a substantially channel shaped push rod 19 connected to the piston 18. Each end 19a of the push rod 19 is inserted into an end opening 10a of the second runner 10 so as to press the foremost end of the push rod 19 against the outermost end of the feeding sliders 4. Numeral 20 in the drawing denotes a base of the metal mold 3 and numeral 21 is a station for supporting the driving or moving means 5.

Figure 1:
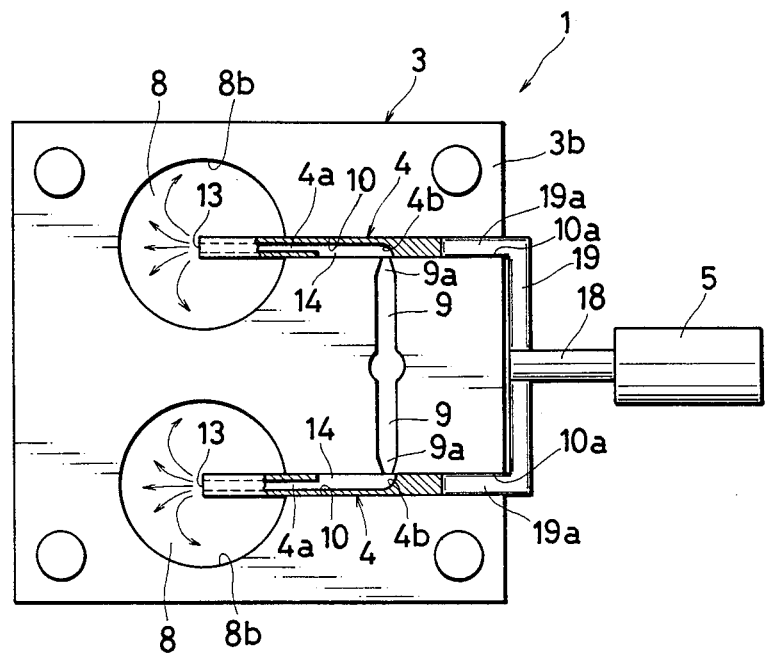
FIG. 1 is a partially cutaway plan view showing a lower metal mold of an extruding instrument for forming resin concave lenses according to the invention.
Figure 4:
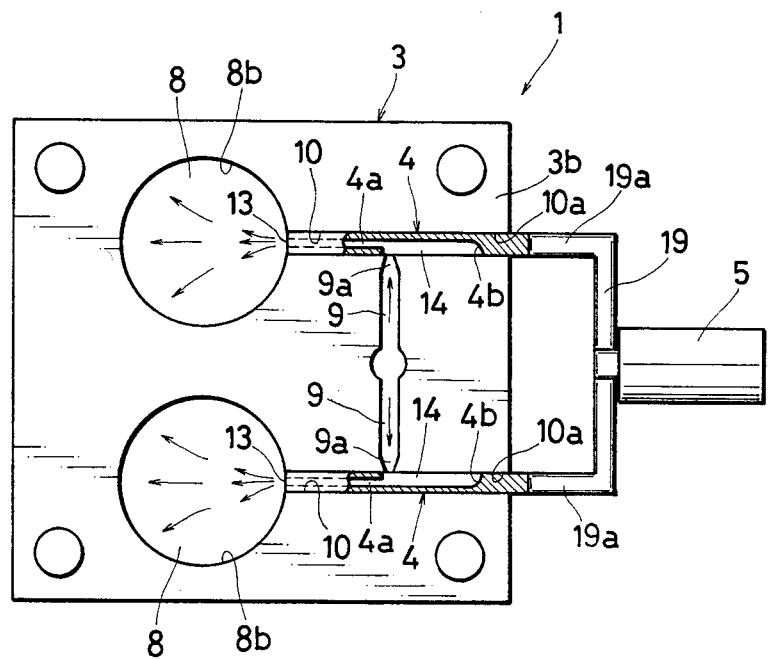
FIG. 4 is a partially cutaway plan view of a lower metal mold member showing when a quantity of molten resin material has been fed.
Figure 5:
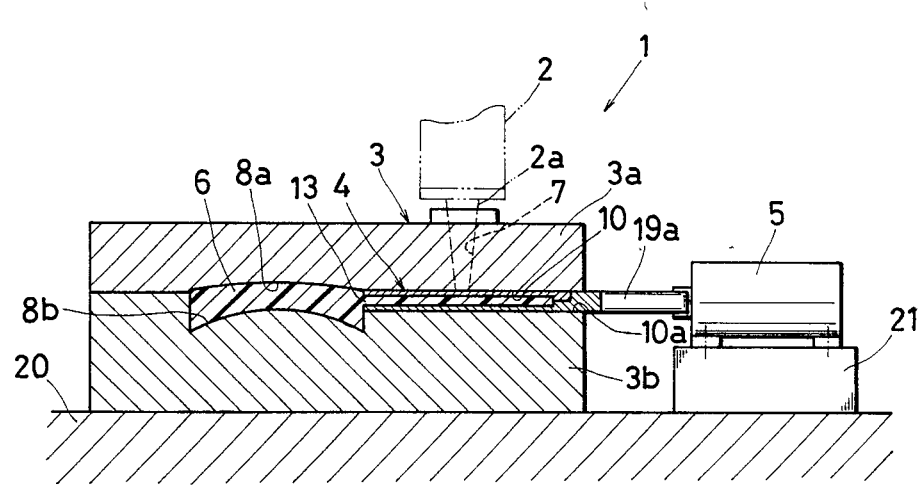
FIG. 5 is a vertical cross sectional elevational view of the raw material when the latter material has been fed.

The illustrative embodiment will now be described in connection with its operation. The moving or driving means 5 is initially moved forwardly (i.e. left) and the feeding mouth 13 in the uppermost end of the feeding slider 4 is held in position substantially intermediate (i.e. substantially at the center) of the molding member 8 as shown in FIGS. 1 and 2. In that state, the raw resin material 6 is fed through the spool 7 and the first runners 9 from the aperture 14 into the channels 4a of the sliders 4 and then injected from the mouth 13 into the molding member 8. If in this case the channel shaped frame member 19 of the moving or driving means 5 is moved back, the feeding sliders 4 are also gradually moved back while at the same time carrying out injection operation of the resin raw material 6 into the metal mold 3 under pressure that is imposed upon the foremost ends of the feeding sliders 4 and the outermost ends 4b of the channels 4a as the raw resin material 6 is filled into the molding member 8 until, at last, the feeding mouth 13 comes to the circumferential position of the molding member 8, thus, being brought into contact with the frame 19 and to a halt, as shown in FIGS. 4 and 5.

In this case, a quantity of molten resin material in the molding member 8 is made to flow from the intermediate thin portion of the member 8 to the circumference in a radial direction thereof, to orient itself and at the same time keep on being filled into the molding member 8, as shown in FIG. 1. When the feeding mouth 13 reaches the outer periphery of the molding member 8, a quantity of molten resin material 6 is completely filled in the inside of the member 8 and begins the curing action with uniformity.

After a fixed length of time has elapsed, the upper metal mold member 3a is raised to remove the upper frame member 11 of the sliders 4. Then, a hardened concave lens product is removed, thereby to provide a concave lens that is substantially free of weld line.

Since the feeding slider 4 is formed to be vertically dividable in the longitudinal direction, it is quite easy to take out the lens once it is formed into a concave lens. Furthermore, a plurality of molding members 8 are provided within a single metal mold. Also, feeding sliders 4 are housed in a second runner 10 which is intercommunicated with the molding member 8. Thus, it is possible to produce a plurality of resin concave lenses merely by use of a single operation of the metal mold 8.

What is claimed is:

1. An injection molding apparatus for forming resinous concave lenses which have outer areas thicker than intermediate center areas, comprising at least one set of molds for forming the lenses, comprising an upper mold portion and a lower mold portion disposed opposite to said upper portion, said upper portion and said lower portion being engageable with each other, said molds having an inside molding space therebetween corresponding to said concave lense when said upper portion and said lower portion are aligned and engaged with each other;

a runner means disposed between said upper portion and said lower portion of said mold and providing access from an outside of said mold to said inside molding space of said mold;

a feeding slider disposed within said runner and being movable therewith, said slider comprising an upper part, a lower part engageable with said upper part, a mouth at one end thereof, and an aperture toward another end thereof, and a channel connecting said mouth and said aperture, wherein said raw material, comprising resin for forming said concave lenses, is fed under pressure into said aperture and through said channel to exit through said mouth and into said inside molding space of said molds, said upper part of said slider being associated with the upper portion of said mold and said lower part of said slider being associated with said lower portion of said mold, and said upper part of said slider being movable away from engagement with said lower part when said upper portion of said mold is moved away from engagement with said lower portion of said mold, thereby to enable ready access for removal of molded lenses from said mold;

driving means comprising rod means for initially moving said slider along said runner to locate said mouth of said slider within said molding space at substantially the center thereof whereat the distance between the upper portion of the mold and the lower portion of the mold is thinner than at the outer periphery of said molding space; and means for feeding said raw material under pressure into said aperture and through said channel and to exit through said mouth of said slider into said center of said molding space initially and thereafter said slider moves toward the periphery of said molding space as said raw material under pressure fills up said molding space starting at said center and extending radially outward to said periphery of said molding space, thereby to form said concave lenses being substantialy free of weld lines.

* * * * *